United States Patent [19]
Eblovi

[11] 3,887,152
[45] June 3, 1975

[54] AUTOMATIC VEHICLE PROTECTION SYSTEM

[75] Inventor: Roger Eblovi, Fairport, N.Y.

[73] Assignee: General Signal Corporation, Rochester, N.Y.

[22] Filed: Oct. 1, 1973

[21] Appl. No.: 402,415

[52] U.S. Cl................ 246/37; 246/34 R; 246/63 C
[51] Int. Cl............................................. B61l 21/06
[58] Field of Search ............ 246/63 R, 63 C, 187 B, 246/182 R, 37, 34 R

[56] References Cited
UNITED STATES PATENTS

| | | | |
|---|---|---|---|
| 1,710,495 | 4/1929 | Blake................................ | 246/63 C |
| 1,710,496 | 4/1929 | Day................................... | 246/63 C |
| 2,731,550 | 1/1956 | Stafford ........................... | 246/182 R |
| 3,328,581 | 6/1967 | Staples.................................. | 246/37 |
| 3,387,064 | 6/1968 | Joy...................................... | 246/34 R |
| 3,748,466 | 7/1973 | Sibley................................ | 246/63 C |

*Primary Examiner*—M. Henson Wood, Jr.
*Assistant Examiner*—Reinhard J. Eisenzopf
*Attorney, Agent, or Firm*—Pollock, Philpitt, Vande Sande

[57] ABSTRACT

An automatic train protection system is disclosed for automatically operated vehicles. This system is not based upon the steel wheel riding on a steel rail and therefore is capable of use with rubbered tired vehicles. A single signal rail carries train detection current and train signaling current. Brushes, mounted on the vehicle, contact the signal rail. These brushes provide a shunting path to shunt train detection current away from the signal rail for train detection. The current shunted away from the signal rail by the brushes is utilized on the train to indicate the proper operation of the brushes. The signal rail is sectionalized or divided into blocks with one detection relay for each block. The relay contacts associated with blocks in advance of a particular block are combined in circuits to select proper vehicle command signals in accordance with traffic in advance of the vehicle. A vehicle command generator provides a plurality of commands for the vehicle. The contacts of the detecting relays select the appropriate command for the vehicle in accordance with traffic conditions in advance of the vehicle. The vehicle commands are communicated to the vehicle over the same signal rail and through the same brushes which form a part of the vehicle detection system.

Five different commands are generated by the wayside equipment and capable of being transmitted to the vehicle. Three of these commands are speed commands and each contains a speed limit for the vehicle and a velocity command for the vehicle. The two other commands are stopping commands. The stopping commands differ in the distance the vehicle is controlled to travel after receipt of the command, before it comes to a stop.

7 Claims, 8 Drawing Figures

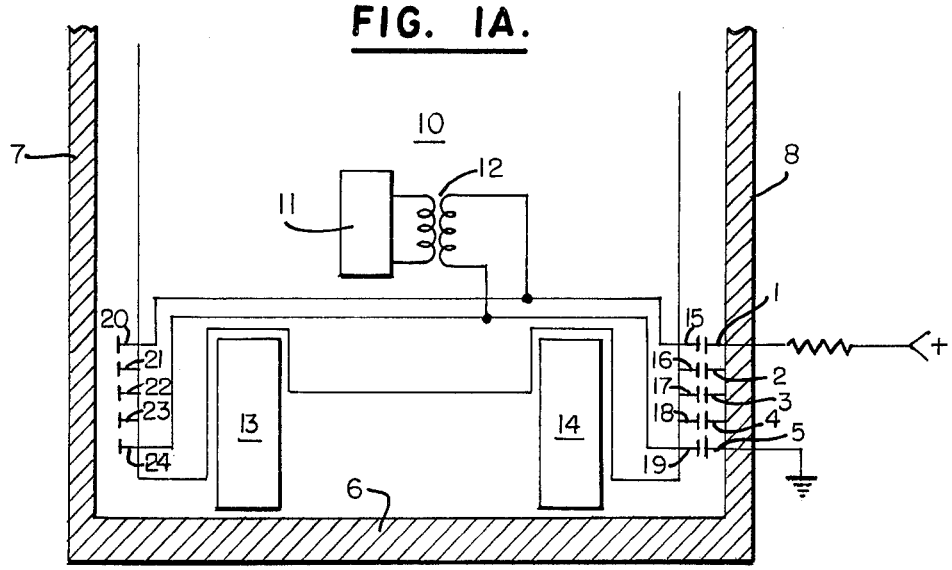
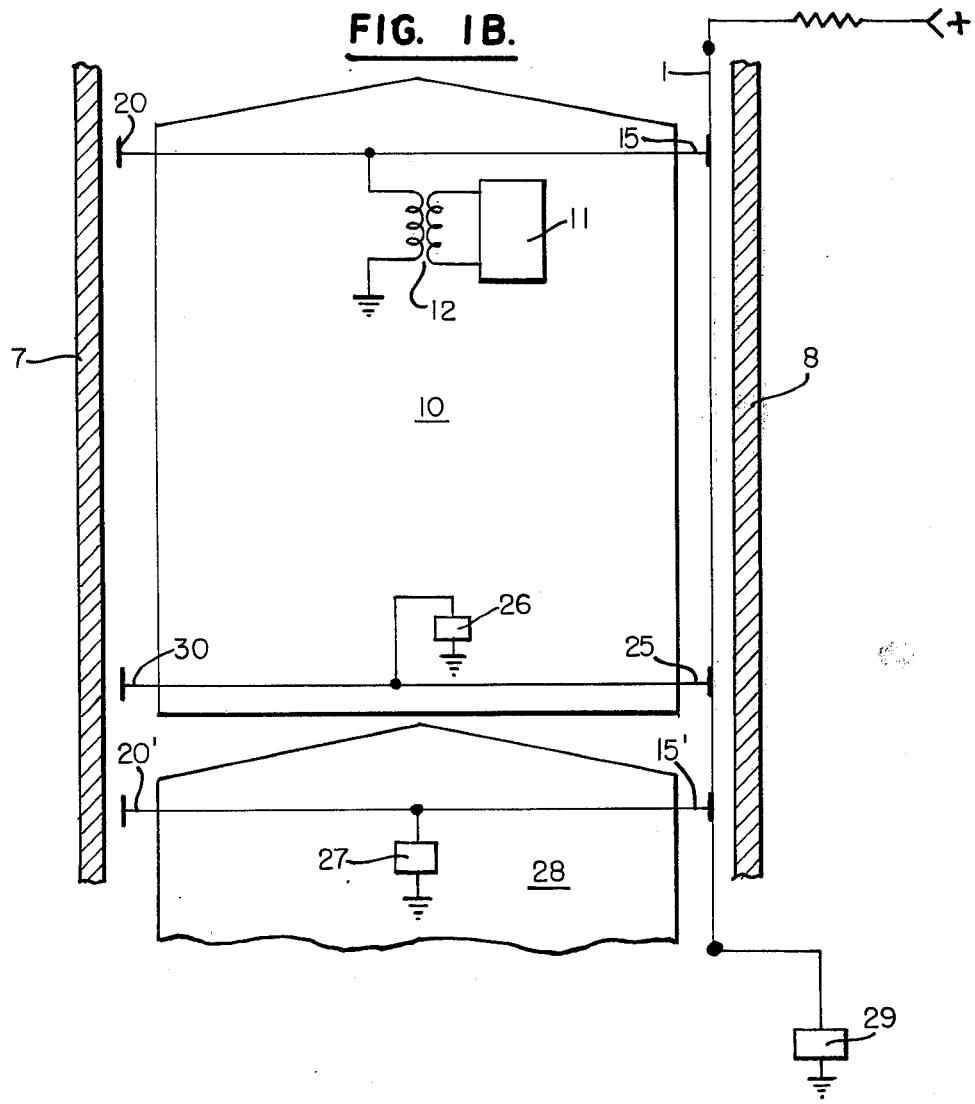

AUTOMATIC VEHICLE PROTECTION SYSTEM

BACKGROUND OF THE INVENTION

The steel wheel, riding on a steel rail, has been a combination utilized by railroad industry for many years. This combination provides characteristics which are advantageous for high load - long distance movement of vehicles. The prime characteristic of this combination is the low friction coefficient exhibited between the wheels and the rails which minimizes frictional losses in the motion of the vehicless. However, for mass transit applications in which the prime characteristics are light weight, high acceleration, high speed, and close headway, the steel wheel on steel rail combination provides a number of disadvantages. The majority of these stem from the same low frictional coefficient between the steel wheel on the steel rail. This of course limits the acceleration capabilities of the vehicles. Therefore, a number of mass transit systems have employed rubber tired vehicles riding on a variety of surfaces. However, the use of rubber tired vehicles rules out the possibility of using the conventional steel wheel on steel rail track circuit for vehicle detection purposes. That track circuit relied upon the electrical continuity between the steel rails and the steel wheels to complete a circuit in order to detect vehicle presence. The rubber tired wheels obviously cannot cooperate in a circuit of this sort. Therefore, when using rubber tired vehicles, a new vehicle detection system must be employed. However, this system, in order to be fail-safe, must exhibit the same characteristics as that exhibited by the steel wheel on steel rail detection system. In particular, the system must minimize the possibility of a vehicle whose presence is not detected. Since the automatic train protection system is based upon knowledge of the presence of all vehicles in advance of any particular vehicle, the failure to detect a vehicle could result in disasterous consequences. Therefore, a prime requirement of any automatic train protection system is the ability to detect the presence of vehicles with little margin for error. If the presence of undetected vehicle is even possible, the system must have means of detecting this possiblity in order to take adequate protective measures.

Regardless of the method of detecting the presence of vehicles, the conventional automatically operated train systems select a speed for a vehicle in dependance upon the number of clear blocks in advance of the vehicle. Thus, if only one clear block is in advance of the vehicle, it will be controlled to a low speed or a stop, if two blocks are clear in advance of the vehicle, it will be controlled to a medium speed and if three or more clear blocks are in advance of the vehicle it will be controlled to a high speed. The number of clear blocks in advance of a vehicle is determined by combinations of contacts of train detecting relays for blocks in advance of any particular vehicle. A significant difficulty with this system is that at the transition from high to a medium or a medium to a low speed signal, the vehicle brakes are applied. This is a consequence of the system philosophy which requires that the brakes be applied as soon as a train is detected as being over speed. When a train makes a transition from a high to a medium speed signal or a medium to a low speed signal, the train is detected as being over speed. This results in inefficient operation of the vehicles, unnecessary brake wear and discomfort to the vehicle passengers. This problem is particularly acute in mass transit applications in which high speed and close headway are prime characteristics of these sytems. In the system of the present invention, each vehicle receives a speed limit signal and a speed command signal. The speed limit signal is the same as the one employed in the prior art systems. And as a result, if a vehicle is detected as proceeding at a velocity in excess of the speed limit, the vehicle brakes are applied. However, the vehicle also receives a speed command signal which may be nominally the same or lower than the speed limit signal. However, the speed command signal anticipates changes in the speed limit signal so at the speed limit transitions the vehicle, when properly controlled, is traveling at a speed below the new speed limit. Utilizing this system speed transistions can be made more smoothly than in the prior art. This reserves an over speed condition for a truly emergency situation and reduces the wear on the train braking as well as reducing the discomfort to the passengers.

BRIEF DESCRIPTION OF THE DRAWINGS

The invention will now be described in this specification taken in conjunction with the attached drawings in which;

FIG. 1a is a cross-section illustrating the relationship of the vehicle, roadway, and power and signal connections therebetween;

FIG. 1b is a plan view of the showing of FIG. 1a;

DETAILED DESCRIPTION OF THE INVENTION

Figure 2A:
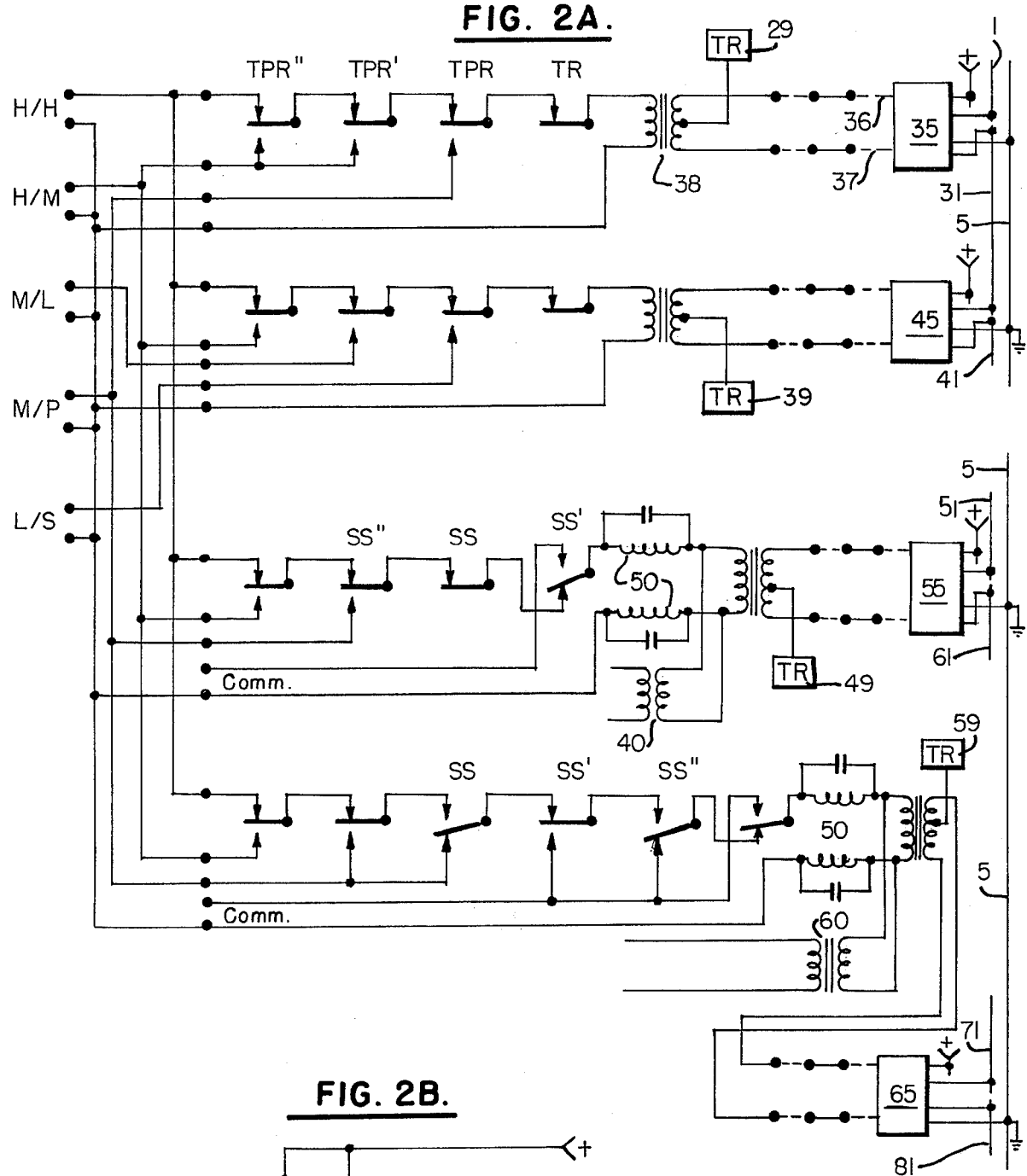
FIG. 2a is a schematic of the wayside equipment for detecting vehicle presence and selecting vehicle command signals.

FIGS. 1a and 1b show, schematically, the manner in which the vehicle receives signals from the wayside and the manner in which it manifests its presence to the wayside equipment. In FIG. 1a, a vehicle 10 is shown traveling along a roadway made up of a roadway base 6 with side walls 7 and 8. Mounted on side wall 8 are conductive rails 1 through 5. Each of these rails extends longitudinally along the side wall 8, as shown in FIG. 1b for rail 1. The height of the side walls 7 and 8 need only be sufficient to support the five longitudinally extending rails.

The vehicle 10 is supported on the roadway 6 by rubber tired wheels 13 and 14. Each vehicle carries four sets of brushes which may conductively engage the longitudinally extending rails which are mounted on the side walls. Each of the vehicle's sets of brushes is mounted at one corner of the vehicle. The right front brushes shown in FIG. 1a comprise brushes 20 throug 24. As shown in FIG. 1a, corresponding ones of the front brushes are interconnected, for instance, brushes 15 and 20 are connected together. The brushes themselves can be of any suitable design so long as they conductively engage the corresponding rail.

FIG. 1a shows schematically that rail 1 is supplied with DC energy and that rail 5 is grounded. Rail 1 is the signal rail and is also supplied with signaling energy. The manner in which this energy is coupled to the rail and from the rail into the vehicle will be explained in more detail with respect to FIG. 2a. Rails 2 through 4 supply propulsion energy for the vehicle which is coupled through brushes 16 through 18. The number of propulsion rails or even the existence of the propulsion rails has no bearing on the present invention. That is, more or less propulsion rails could be provided or the propulsion rails could even be eliminated depending upon the type of propulsion employed for the vehicles.

FIG. 1b illustrates not only the front brushes 15 and 20 of the vehicle 10 but also the rear brushes 25 and 30. In addition, FIG. 1b also illustrates the second type of vehicle 28. As is conventional in most rapid transit applications, the lead vehicle receives the signaling information and controls the entire train. However, although the rear vehicles need not receive the signaling information, they still must be detected by the wayside presence detecting system. Therefore, the rear vehicles such as vehicle 28 include four sets of brushes as well, left and right front, left and right rear. However, both the front and rear brushes of the rear vehicles 28 are connected as the rear sets of brushes of the vehicle 10. FIG. 1b also illustrates that the signal rail 1 is connected to a block occupancy relay 29. In the absence of a vehicle in any block, the energy supplied to the signal rail 1 by the power source is sufficient to enable the relay 29 to be energized. This serves to indicate that the block is unoccupied. As is shown in FIG. 1a, brush 15 couples signal rail 1 to the primary of a transformer 12. The other terminal of the primary of transformer 12 is coupled to brush 19. Brush 19, contacting signal rail 5, is connected to ground. The DC resistance of the primary of transformer 12 is sufficiently low such that the current shunted away from block occupancy relay 29 through the primary of transformer 12 to ground is sufficient to cause the relay 29 to drop away. The rear signal brushes of the lead vehicle 10 are connected to a relay 26, on board the vehicle. The front brushes 15' and 20' of the vehicle 28 are also connected to a vehicle carried relay 27. The remaining brushes of the vehicle 28 are also connected to a vehicle carried relay (not shown).

In operation, when no vehicles are present in a particular block, the DC energy supply to the signal rail 1 is sufficient to hold energized the block occupancy relay 29. However, as soon as the front brushes of a vehicle, such as brush 15, enter a block, the current shunted away from the block occupancy relay 29 to the primary of transformer 12 and thence to ground through the ground rail 5, is sufficient to cause the block occupancy relay 29 to be dropped away indicating the presence of the vehicle. The DC resistance of the primary of transformer 12 is so proportioned that the energy remaining on the signal rail 1 behind the lead brush 15 is sufficient to energize the vehicle carried relays 26, 27, etc. These relays are relied upon to indicate the proper operating condition of the brushes 25, 15', etc. If any of these vehicle carried relays become dropped away, the system senses that the associated brush is not operating properly and takes appropriate measures. The proper operation of the brushes is necessary to ensure adequate train detection, for if a brush does not provide the conductive contact between the signal rail 1 and the ground rail 5, the vehicle's presence will not be indicated. Identical sets of brushes are mounted on both sides of the vehicles so that regardless of which side of the roadway the rails are mounted, the vehicle can properly cooperate therewith. Normally, only the brushes on one side of the vehicle would be in operation at any one time.

In order to detect the location of the vehicle, the signal rails 1 are sectionalized so that the block occupancy relay 29 indicates the presence or absence of vehicles within a block which is defined as the extent of the associated signal rail with which the block occupancy 29 is associated.

Mention has been made that signaling current also flows on the signal rail 1, and the manner in which this signaling current is generated and coupled to the signaling rail 1 will be discussed in more detail with respect to FIG. 2a. The signaling current, however, is coupled through the brush 15 to the primary of the transformer 12. The signaling current then induces a corresponding signal in the secondary of the transformer 12 which is coupled to the vehicle carried equipment 11. This equipment will be discussed in more detail with respect to FIG. 3.

Now that the manner in which vehicles are detected has been explained, we will explain how this information is utilized in order to select the proper vehicle commands and how those commands are transmitted to the vehicle. The goal is to transmit a vehicle command to the vehicle which reflects traffic conditions in advance of the vehicle such that the vehicle will be allowed to proceed at the proper speed in light of those traffic conditions. The five specific vehicle commands utilized in this invention are available to the wayside equipment. These signals are represented as H/H, H/M, M/L, and L/S. The manner in which these signals are generated by the wayside equipment will be explained in relation to FIG. 3. The first letter in the signal representation relates to the speed limit, as interpreted by the vehicle, and the second letter relates to the speed command. Thus, H/H represents a high-speed limit with a high-speed command whereas H/M represents a high-speed limit with a medium-speed command and M/L represents a medium-speed limit with a low-speed command. The high-speed command, although nominally the same as the high-speed limit, is actually slightly below the speed limit. In this manner a vehicle being controlled to a high speed has some tolerance if it speeds up before exceeding the high speed limit. For instance, the high speed limit may be 27 ft/sec whereas the high-speed command will control a vehicle to travel at 25 ft/sec. In the same fashion, the medium and low-speed commands are slightly below the medium and low-speed limits. The two stopping commands are M/P and L/S. The stopping command M/P is available to a vehicle which is proceeding at a medium speed, or below, and will bring the vehicle to a stop at a predetermined distance. The other speed command, L/S, will cause a vehicle proceeding at a low speed to stop at another predetermined distance, shorter than the first predetermined distance referred to. The manner in which the speed commands control the vehicle is described in the copending application of S. Macano (GR-355), filed Sept. 28, 1973, Ser. No. 401,727, assigned to the assignee of this application.

Figure 2B:
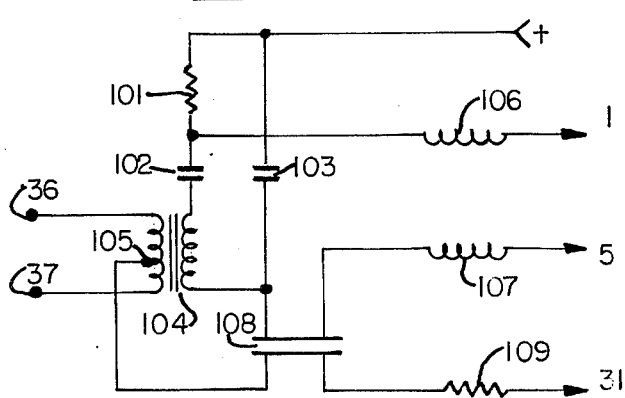
FIG. 2b is a schematic showing of a coupling unit to couple signals between the wayside equipment shown in FIG. 2a and the signal rail.

As shown in FIG. 2a, the signal rail is sectionalized, one section for each block. Shown in FIG. 2a is one block corresponding to the signal rail 1, another block corresponding to the signal rail 31, still another block corresponding to the signal rail 41, a further block corresponding to the signal rail 51, a block corresponding to the signal rail 61, a block corresponding to the signal rail 71, and finally a block corresponding to the signal rail 81. A coupling unit is provided at the block boundaries; coupling units 35, 45, 55, and 65 are shown in FIG. 2a. The schematic of the coupling unit is shown in FIG. 2b and will be described in reference thereto. The signal input to coupling unit 35 is provided by leads 36 and 37 and provides a signaling current for the block of signal rail 1. This signal is coupled to these conductors by a transformer 38. Which of the possible signals is provided to the primary of transformer 38 is determined by the relay network comprising the contacts TR, IPR, TPR', and TPR". The coupling unit 35 is not only connected to signal rail 1 but is also connected to the signal rail 31 of the next block in the direction of traffic. The block occupancy relay for signal rail 31 is 29. Contacts TR are contacts of that relay. The contacts of TPR are contacts of the next block relay, in the direction of traffic, contacts TPR' are contacts of still the next block and contacts TPR" are contacts of a still further block in the direction of traffic. If the block corresponding to signal rail 31 is occupied, then any traffic in the block corresponding to signal rail 1 should be stopped. When the block corresponding to signal rail 31 is occupied, relay 29 will be dropped away thus opening contacts TR to open the signal path to signal rail 1. As a result, there will be no signal in signal rail 1. The lack of any signal in this block prohibits the movement of traffic therethrough. If block 31 is unoccupied, but the next succeeding block, 41, is occupied, then any traffic in the block corresponding to signal rail 1 should be also brought to a stop since the system philosophy requires a clear block between vehicles. Under these circumstances, the contact TR would be closed but the contact TPR would be open. In this configuration the M/P stopping command will be supplied the traffic in the block corresponding to signal rail 1. If the closest traffic to the block corresponding to signal rail 1 exists in the block in advance of signal rail 41, then contacts TR and TPR will be closed but contact TPR' will be open supplying an H/M signal to the traffic in block 1 and finally, if there are four clear blocks ahead of the traffic in the block corresponding to signal rail 1, then all relay contacts TPR", TPR', TPR, and TR will be closed providing an H/H signal to the traffic in the block corresponding to signal rail 1. Thus the switching arrangement associated with the coupling unit 35 illustrates one manner of selecting the available signals for safely controlling the traffic in one block. In particular, one of the signals H/H, H/M, or M/P is utilized. Generally, regardless of the arrangement, the speed command anticipates the speed limits. That is, the speed command transitions occur one block in advance of speed limit transitions so that the vehicle, when it reaches a speed limit transition is already traveling at or below the new speed limit.

The switching arrangement associated with the coupling unit 45 shows another arrangement in which the signals H/H, H/M, M/L, and L/S are selected from depending upon traffic conditions.

The switching arrangement associated with the coupling units 55 and 65 are illustrative of the switching arrangements associated with station stopping areas. In addition to providing a stopping command for vehicles when traffic conditions require the same, the system must also provide a stopping command for a vehicle so that it may stop at a station area. The necessity for stopping vehicles at a station exists regardless of the traffic conditions in advance of the vehicle. For this reason, the commands to stop a vehicle at a station area must be independent of traffic conditions. With respect to the coupling unit 55, the relay contact SS", when dropped away, provides an M/P stopping command for the traffic in block 51 regardless of traffic conditions in advance of the vehicle. When relay contact SS" is in its picked-up position, it transmits, to the traffic in block 51, traffic commands commensurate with the traffic conditions in advance of the vehicle. Once a vehicle is stopped, contact SS can open thereby preventing the further transmission of traffic based commands to the vihicle in block 51.

The switching arrangement associated with the coupling unit 65 shows a different arrangement for performing a similar function. In this case, when the contact SS is dropped away, an M/P stopping command is provided to the vehicle regardless of traffic conditions in advance of block 71.

The description of the apparatus represented in FIG. 2a has so far been concerned with information flow from the wayside to the vehicle. However, this system also contemplates information flow from the vehicle to the wayside via the same path as used for vehicle signaling. The communication aspects of this apparatus are described more fully in copending U.S. Pat. application of Charles Andreasen (GR-357), Ser. No. 402,414, filed on Oct. 1, 1973 assigned to the assignee of this application. When the vehicles are running in normal operation, a communication path exists for information transmitted from the vehicle through the signal rail, the coupling unit and transformer 38 through the contacts of the switching arrangement to the wayside receiver. However, when the relay SS (in the switching arrangement associated with the coupling unit 55) drops away, this communication path is open. Therefore, the relay SS', when picked up, provides a communication path for information transmitted from the vehicle. A second communication path is also available through the transformer 40. Transformer 40 cooperates with L-C combinations 50 in a manner which is explained in the above referred to application.

A similar arrangement for communication purposes exists in a switching arrangement associated with coupling unit 65. For this purpose the back contacts of SS' and SS" are coupled to the communication path for information transmitted from the vehicles. Similarly, a transformer 60 also provides a second communication path for information transmitted from the vehicles. Similar L-C combinations 50 cooperate with this transformer 60 in a manner which is more fully explained in the above referred to copending application.

FIG. 2b illustrates the schematic of the coupling units which are shown in FIG. 2a as 35, 45, 55, and 65. A positive source of DC energy is connected to the terminal plus which terminal is connected through a resistor 101 to one side of a capacitor 102. DC energy flows through resistor 101, through choke 106 to the signal rail, for instance, 1. The ground rail 5 is connected through choke 107 to one terminal of a capacitor 108. The same terminal of capacitor 108 is connected to one winding of a transformer 104. The other terminal of this winding is connected to the other terminal of capacitor 102. The first terminal of the winding of transformer 104 is connected to one side of a capacitor 103, the other side of which is connected to the positive source of DC energy.

The other terminal of capacitor 108 is connected, through resistor 109, to the next signal rail, in the direction of traffic; 31, for instance. This same terminal of capacitor 108 is connected to the center tap of the other winding of transformer 104. The other winding of transformer 104 is connected between terminals 36 and 37. Terminals 36 and 37 (shown in FIG. 2a) are connected across one winding of a transformer 38, the center tap of which is connected to the detecting relay 29. The chokes, 106 and 107, are part of the lightning protection system and perform no function in the traffic detection system. The traffic detection is carried out by means of DC energy and the chokes 106 and 107 present a negilgible resistance to that energy.

Consider the DC energy supplied from the coupling unit 45 to the signal rail 31. With no traffic present in the block associated with signal rail 31, that energy is coupled through resistor 109 to the center tap 105 of the transformer 104. The DC current flows through the center tap of transformer 38 to the traffic detecting relay 29. With traffic absent from the block associated with signal rail 31, relay 29 will be picked up indicating a lack of occupancy. However, when a vehicle enters the block associated with signal rail 31, the shunt provided by the brushes on the vehicle will shunt away sufficient current so that occupancy detecting relay 29 becomes dropped away.

The vehicle signaling information which is provided to the transformer 38 by the switching arrangement is coupled through terminals 36 and 37 to transformer 104. This signaling current is then provided to signaling rails 1 and 5 and thence made available to the vehicle. Information flow from the vehicle is picked up by signal rail 1 and coupled through this same path in the opposite direction to be received by the wayside equipment.

Figure 4A:
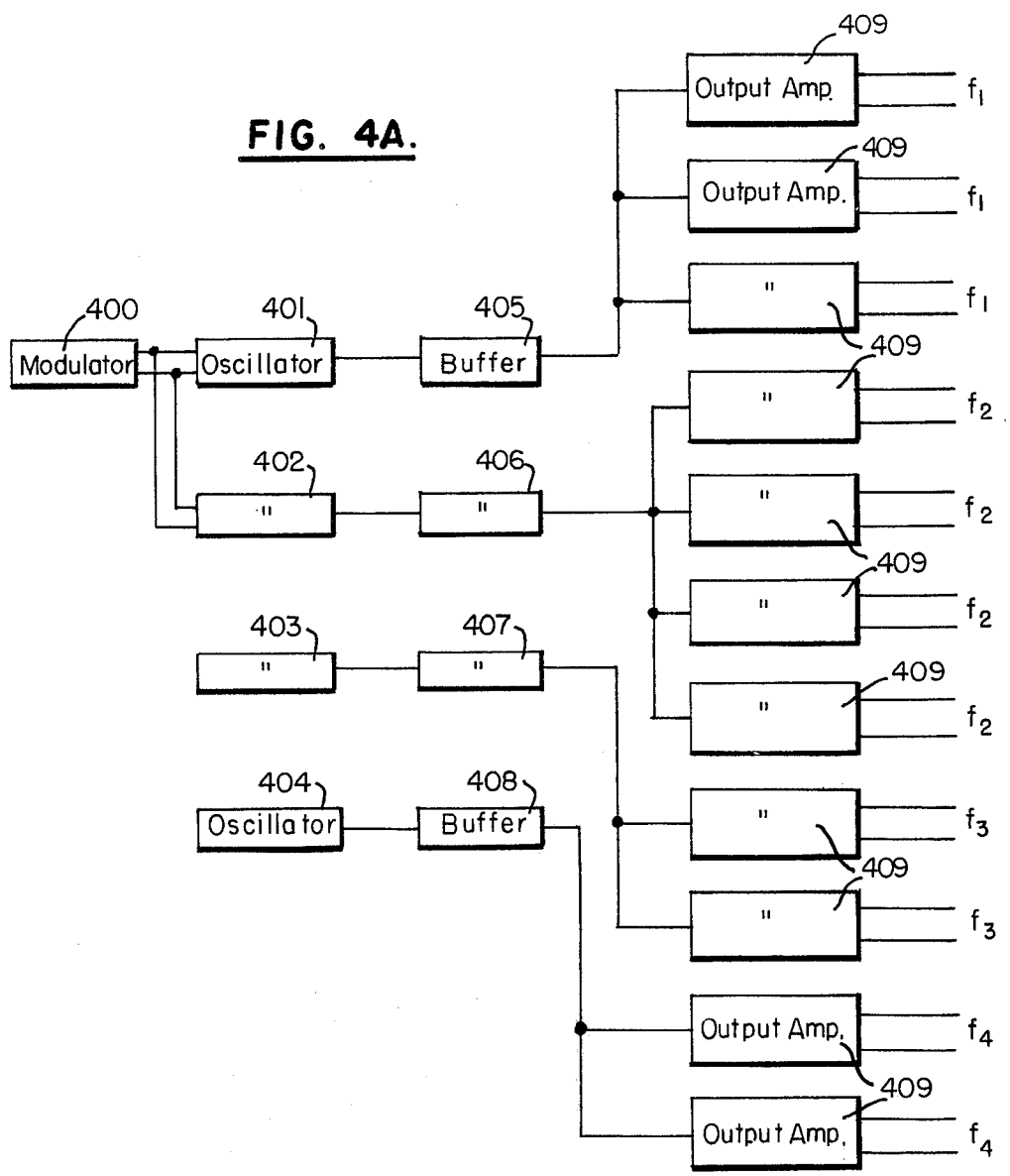
FIGS. 4a and 4b, taken together, illustrate the wayside equipment to generate the various signals capable of being transmitted to the vehicles.
Figure 4B:
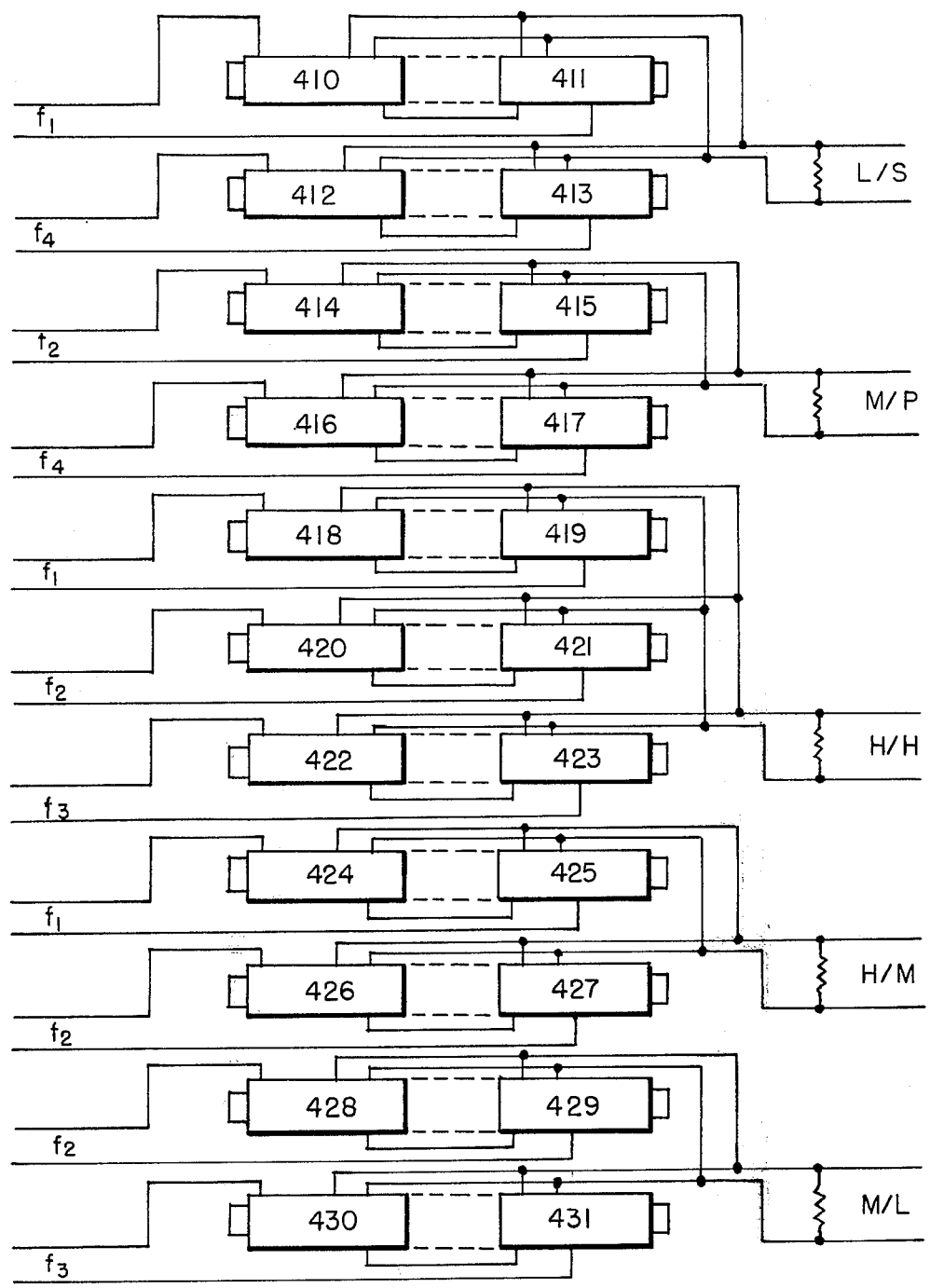

FIGS. 4a and 4b, taken together, illustrate the apparatus which provide, on the wayside, the five different vehicle commands.

In FIG. 4a, a modulator 400 operates as oscillator 401. In one embodiment of this invention, the modulator 400 varies the output of the oscillator 401 at a low rate, such as 10 to 15 hertz. The oscillator 401 produces one of two adjacent audio frequencies (F1a, F1b) switched at the rate controlled by the modulator 400. The modulator 400 also controls another oscillator 402 to produce another pair of audio frequencies (F2a, F2b) different than the first pair. The oscillator 402 then produces one of the second pair of audio frequencies, also switched by the modulator 400. The output of the oscillator 401 is referred to as F1. It consists of two audio tones, one or the other of which is always on and which swithces at a low (10 to 15 hertz) rate. The output of oscillator 402 is considered F2. This also consists of two audio frequencies (different than the first two) one of which is always on and which are switched at a rate controlled by the modulator 400 (also a low rate, 10-15 hertz). Oscillator 403 produces a fifth frequency, referred to as F3, and oscillator 404 produces a sixth frequency, referred to as F4. The buffers 405 to 408 couple these signals, respectively, to output amplifiers 409. Three of the amplifiers 409 produce, as outputs, F1. Four of the output amplifiers 409 produce, as outputs, F2. Two output amplifiers produce, as outputs, F3 and finally, two output amplifiers 409 produce, as outputs, F4.

These signals are coupled together by the apparatus of FIG. 4b as follows. The F1 and F4 signals are coupled together and produce a signal which is referred to as L/S. F2 and F4 are coupled together and produce the signal referred to as M/P. Three signals, F1, F2, and F3, are coupled together and produce the signal referred to as H/H. Two signals, F1 and F2, are coupled together and produce the signal referred to as H/M and finally two further signals, F2 and F3, are coupled together to produce the signal referred to as M/L.

The coupling units (410–413) are tuned transformers. In the case of those coupling F1 (410, 411, 418, 419, 424, and 425) one of the pair is tuned to F1a and the other is tuned to F1b. The same is true for those coupling F2 (414, 415, 420, 421, 426, 427, 428, and 429) except that one is tuned to F2a and the other is tuned to F2b. The coupling units associated with F3 (422, 423, 430, and 431) are tuned to F3 and those associated wth F4 (412, 413, 416, and 417) are tuned to F4.

The two complex signals, F1 and F2, are referred to as vital signals in that one or the other must be received by the vehicle for it to proceed. The further signals F3 and F4 are merely signal modifiers, since they modify the effect of the vital signals present, and their presence or absence is not a vital function.

Figure 5:
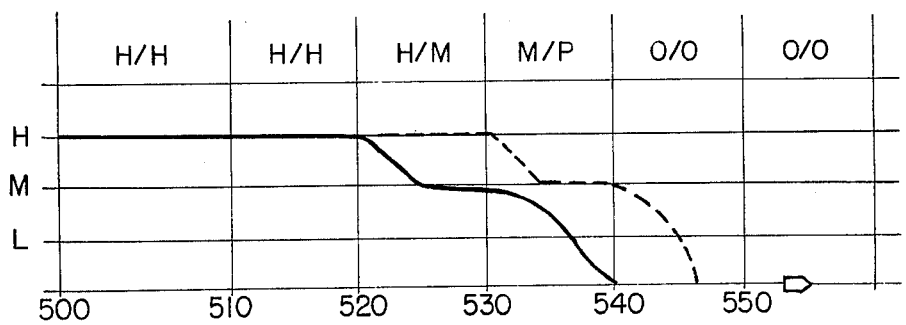
FIG. 5 is a velocity diagram comparing the performance of vehicles operating under the conventional signaling system and under the system of the present invention.

Now that the manner in which the signals are generated has been explained and the manner in which they are communicated to the vehicle has been explained, reference to FIG. 5 will illustrate the difference between the automatic train protection system disclosed herein and the more conventional systems used in the prior art. FIG. 5 is a schematic velocity diagram, velocity versus distance. Block boundaries 500, 510, 520, 530, 540, and 550 are illustrated, with a vehicle being illustrated in block 550. In the conventional systems, vehicles entering blocks 500, 510, and 520 would be given a high-speed signal, a vehicle entering block 530 would be given a medium-speed signal, and a vehicle entering block 540 would be given a stop signal. As the vehicle, operating under the conventional systems, enters block 530, its high speed, which was allowable in blocks 520, is now over speed in block 530 and therefore an immediate brake application is initiated. When the vehicle has been decelerated to a medium speed, the brakes are released and the vehicle can then continue to operate at the medium speed. When the vehicle enters the block 540, its medium speed, which was allowable in block 530, is now over speed since it is receiving a stop command. The brakes are again applied and the vehicle is brought to a stop. In contrast, to the conventional systems, a vehicle proceeding under the automatic train protection of this invention, would receive an H/H command entering blocks 500 and 510. Upon entering block 530, however, the vehicle would receive an H/M command. The high speed of the vehicle upon entering in block 520, would not result in an over speed condition since the high speed limit in this block is the same as in the preceding block. However, the vehicle would be controlled to a medium speed in this block so that by the time it entered block 530, it would be traveling at a medium speed. The vehicle entering block 530 would receive and M/P command. This is a stopping command which will bring the vehicle which enters the block at a medium speed to a stop in a predetermined distance. Since the vehicle had been receiving an H/M command in block 520, it would exit block 520 at a medium speed. Therefore, when it entered block 530, the vehicle would not be over speed and the vehicle would be controlled to a safe smooth stop in block 530.

Figure 3:
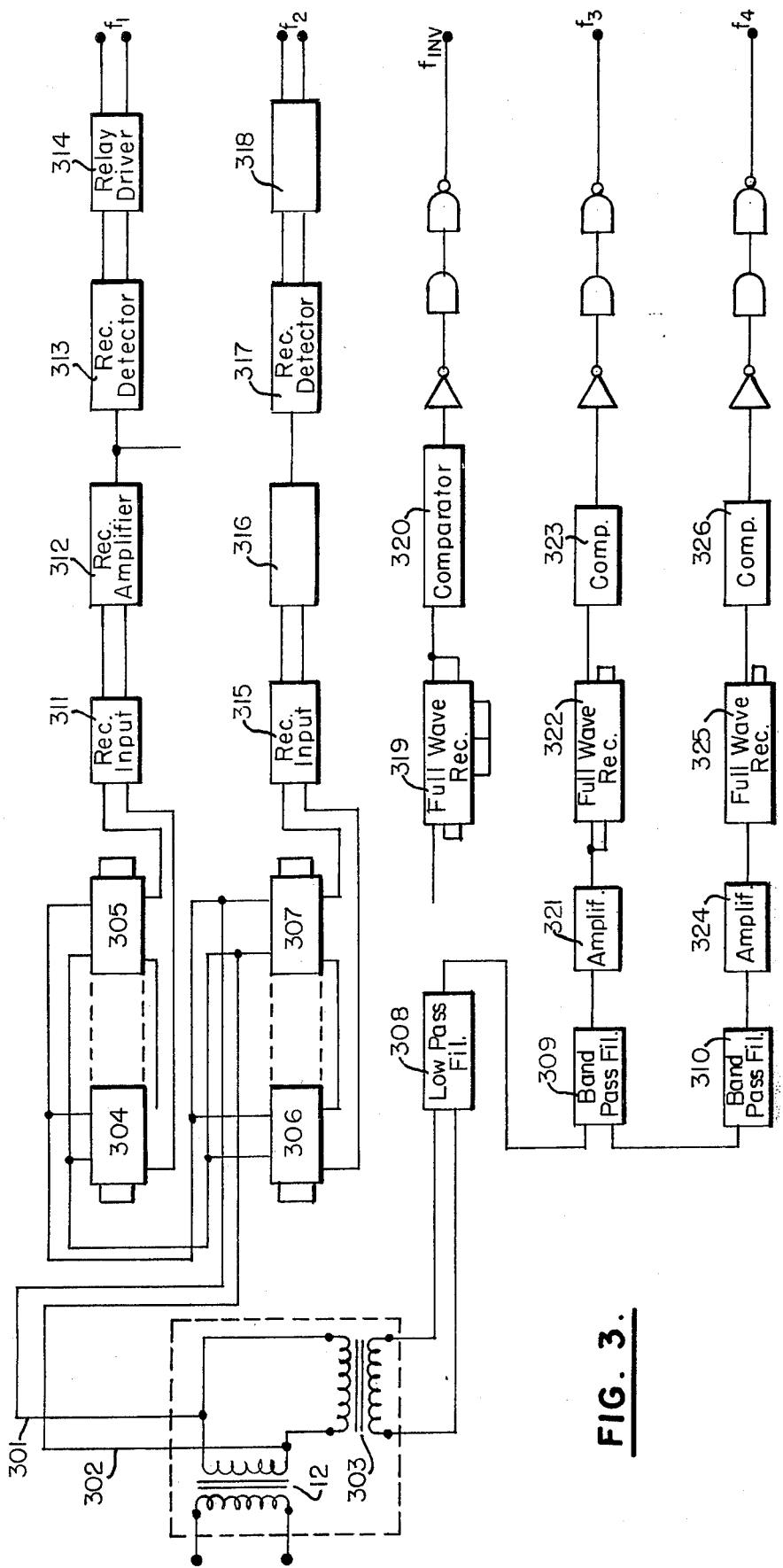
FIG. 3 is a schematic showing of the vehicle carried equipment for decoding the vehicle received signals.

FIG. 3 illustrates how the transformer 12 couples the signals received from the signal rail 1 to the remaining vehicle carried equipment. The apparatus illustrated in FIG. 3 decodes the four different signals, F1, F2, F3, and F4.

One winding of transformer 12 is connected to terminals 301 and 302. The signal provided at these terminals is provided as an input to coupling units 307, 306, 305, and 304. Also connected across one winding of transformer 12 is a winding of another transformer, 303. The other winding of transformer 303 is connected to the input of low pass filter 308.

The outputs of coupling units 304 and 305 are serially connected as the input to receiver input 311. The output of receiver input 311 is connected as the input to receiver amplifier 312, whose output is connected to receiver detector 313 and full wave rectifier 319. The output of receiver detector 313 is connected as an input to relay driver 314.

The output of the full wave rectifier 319 is connected as an input to comparator 320.

The outputs of coupling units 306 and 307 are serially connected as the input to receiver input 315, the output of which is connected to amplifier 316. The output of amplifier 316 is connected as the input to receiver detector 317, whose output is connected to relay driver 318.

The output of low pass filter 308 is connected as the input of band pass filter 309. This same signal, the output of low pass filter 308, is also connected as the input to band pass filter 310. The output of the filter 309 is connected as an input to amplifier 321, the output of which is connected to full wave rectifier 322. The output of the full wave rectifier is connected as an input to comparator 323. A similar arrangement is provided from the output of band pass filter 310 to amplifier 324, full wave rectifier 325 and comparator 326.

The discussion with respect to FIGS. 4a and 4b describes the signal F1 as a combination of two audio tones, one of which is on at all times and the other of which is off. A modulator shifts the on frequency from one to the other of the audio tones at a low rate. The couplers 304 and 305 are a filtering and impedance changing devices, one of which is turned to one of the frequencies which makes up signal F1, and the other is tuned to the other. In one practical embodiment constructed in accordance with the principles of this invention, each of the coupling units comprises a transformer with a serial tuned primary. The receiver input 311 comprises another transformer which is tuned to pass both of the frequencies which make up the signal F1. The resulting sigal is amplified by amplifier 312. The detector 313 comprises two serially connected transformers and secondaries of each tuned to one of the frequencies making up the signal F1. Each of these secondaries drives a transistor amplifier which in turn drives relay driver 314. Relay driver 314 is a vital relay driver in that it must receive one of the frequencies which make up the signal F1 and not the other and then vice versa. This condition must switch at the prescribed rate in order to maintain the relay energized. One such relay driver is illustrated in copending application of D. Hughson et al, Ser. No. 395,674, filed on Sept. 10, 1973, and assigned to the assignee of this application.

The decoding apparatus for the signal F2 is similar except for the tuning of the various tuned circuits. These circuits are, of course, tuned to the components of F2.

The output of amplifier 312 is also provided as an input to full wave rectifier 319. The output of full wave rectifier 319 is compared, via comparator 320, with a predetermined reference signal. If the output of the full wave rectifier exceeds this reference, then the system considers it has received the signal F1NV (F1 non-vital). Since the decoding of F1NV is simpler than the decoding of F1, it takes a correspondingly shorter period of time to be detected. The use of the signal F1NV is more particularly described in the copending application of S. Macano (GR-355), Ser. No. 401,727, filed on Sept. 28, 1973.

The low pass filter 308 has a cut-off frequency which is below the frequencies which make up the signals F1 and F2. As a result, these signals do not pass the low pass filter 308. The signals F3 and F4 are each single frequency signals and in particular, the frequencies are below the cut-off frequency of low pass filter 308. Band pass filter 309 has its pass band centered about the frequency F3 and band pass filter 310 has its pass band centered about the frequency F4. From the foregoing discussion, the decoding of the signals F3 and F4 should be apparent from FIG. 3 and it will not be further discussed.

Thus, the brush 15 (FIG. 1a) provides a coupling for both DC energy (to drop the detection relay in the block associated with signal rail 1) and also signaling energy which is coupled via transformer 12 to the receiver shown in FIG. 3. In addition, information can be communicated from the vehicle to the wayside over the same communication path, of course in the opposite direction. The vehicle carried transmitter is connected to terminals 301 and 302 (FIG. 3). The communication aspects are more fully discussed in the Andreasen application referred to above.

Although the preferred embodiment, disclosed herein, is based upon train detection using DC energy and train signaling using various frequency signals, it should be apparent to those skilled in the art that the train detection system could utilize AC energy of a particular frequency, which, of course, would be different from all communication and signaling frequencies. A band pass filter centered about this frequency could be utilized to restrict the energy actuating the vehicle detection relay and the brush detection relays to energy of this frequency only. Of course, also, the coupling unit would have appropriate filters to ensure that it would not couple energy at this frequency from one sectionalized rail to another. The essential requirement is, of course, that the vehicle detection energy be different and distinguishable from energy used for communication and signaling purposes.

I Claim:

1. A vehicle detection and signaling system comprising, a sectionalized signal rail supplied with energy of one type and with signaling energy different from energy of said one type, and vehicle detection means connected to each section of said sectionalized signal rail and responsive only to energy of said one type, vehicle carried means conductively engaging said signal rail and impedance means connected to said vehicle carried means, said impedance means providing a low impedance path to ground for energy of said one type.

2. The apparatus of claim 1 which further includes,
wayside means for generating a plurality of signals, comprising energy different from energy of said one type, selecting means for selecting a one of said plurality of signals, coupling means conected to said selecting means and said signal rail for coupling said selected signal to said signal rail, and second vehicle carried means distinctively responsive to said selected signal.

3. The apparatus of claim 2 in which said vehicle carried means comprises a plurality of brushes,
vehicle carried detecting means,
at least one of said brushes being connected to said vehicle carried detecting means for detecting, in said brushes, energy of said one type.

4. The apparatus of claim 2 in which said coupling means supplies energy to said one type to said signal rail.

5. The apparatus of claim 4 in which said selecting means is responsive to a plurality of vehicle detection means, each of said vehicle detection means associated with a different section in the direction of traffic along said sectionalized signal rail.

6. A coupling unit for use in a vehicle detection and signaling system in which a sectionalized signaling rail carries vehicle detection and signaling energy comprising, signaling input terminals and a vehicle detection energy input terminal, impedance means connecting said vehicle detection energy input terminal to one section of said signal rail, a transformer, one winding of said transformer connected across said signaling input terminals, seconds impedance means connecting one terminal of said other transformer winding to said one section of said signal rail, said other terminal being grounded, said second impedance means offerring a low impedance to said signaling energy and a high impedance to said vehicle detection energy.

7. The apparatus of claim 6 further including vehicle detection means connected to said primary of said transformer, third impedance means connecting a section of signal rail next in direction of traffic to said transformer primary, and fourth impedance means connecting said third impendance means to ground, said fourth impedance means offerring a low impedance to said vehicle detection energy.

* * * * *